(12) United States Patent
Shu et al.

(10) Patent No.: US 6,233,060 B1
(45) Date of Patent: May 15, 2001

(54) REDUCTION OF MOIRÉ IN SCREENED IMAGES USING HIERARCHICAL EDGE DETECTION AND ADAPTIVE-LENGTH AVERAGING FILTERS

(75) Inventors: Joseph Shu, San Jose; Anoop Bhattacharjya, Sunnyvale; Tsung-Nan Lin, San Jose, all of CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/159,401

(22) Filed: Sep. 23, 1998

(51) Int. Cl.[7] .............................. G06K 15/02; G06K 9/40; G06T 5/00; H04N 1/409
(52) U.S. Cl. ........................... 358/1.9; 358/454; 358/458; 382/199; 382/261; 382/275; 382/224
(58) Field of Search ..................................... 382/199, 260, 382/261, 264, 275, 224; 358/454, 453, 533, 458, 463

(56) References Cited

U.S. PATENT DOCUMENTS

| 4,503,461 | 3/1985 | Nishimura . | |
|---|---|---|---|
| 4,782,399 | 11/1988 | Sato . | |
| 5,001,576 | 3/1991 | Tanaka et al. . | |
| 5,022,091 | * 6/1991 | Carlson | 382/240 |
| 5,231,677 | 7/1993 | Mita et al. . | |
| 5,379,130 | 1/1995 | Wang et al. . | |
| 5,384,648 | * 1/1995 | Seidner et al. | 358/534 |
| 5,535,013 | 7/1996 | Murata . | |
| 5,687,006 | 11/1997 | Namizuka et al. . | |
| 5,799,112 | * 8/1998 | de Queiroz et al. | 382/254 |
| 5,852,678 | * 12/1998 | Shiau et al. | 382/176 |
| 5,911,004 | * 6/1999 | Ohuchi et al. | 382/173 |
| 6,064,768 | * 5/2000 | Hajj et al. | 382/195 |

* cited by examiner

Primary Examiner—Scott Rogers

(57) ABSTRACT

In an image reproduction system, an image processor analyzes a hierarchy of image representations of different resolutions to detect edges. In regions having edges that are detected in all hierarchical representations, little or no filtering is applied to the image. In regions having no edges or edges that are detected in only the highest-resolution representation, greater amounts of filtering are applied to the image. In regions having edges detected in two or more but not all hierarchical representations, an intermediate amount of filtering is applied to the image. In preferred embodiments, two-dimensional averaging filters of varying size are applied to the image. The size of the averaging filter is selected according to the number of hierarchical representations in which an edge is detected.

23 Claims, 10 Drawing Sheets

REDUCTION OF MOIRÉ IN SCREENED IMAGES USING HIERARCHICAL EDGE DETECTION AND ADAPTIVE-LENGTH AVERAGING FILTERS

TECHNICAL FIELD

The present invention is related generally to image processing and is related more particularly to processing scanned representations of screened images such as screened halftone images to generate high-quality renditions with little or no visible moiré.

BACKGROUND ART

Moiré is an artifact that results whenever two geometrically-regular patterns are superimposed. This artifact often manifests itself as a ripple-like pattern in scanned representations of screened images because the geometrically-regular structure of the screened image is superimposed with the geometrically-regular pattern of scanning.

The nature of the moiré that results from scanning depends on a number of factors including: (1) the resolution of the geometrically-regular structure of the screened image, referred to herein as the screen frequency, (2) the resolution of the geometrically-regular pattern for the scanning process, referred to herein as the scan frequency, (3) the relative angle between these two patterns, referred to herein as the screen angle, and (4) the characteristics of the process used to render the scanned representation. Moiré can be reduced by decreasing the screen frequency, increasing the scan frequency, and/or carefully selecting the screen angle, but these simple techniques are generally unsatisfactory.

A tradeoff between screen frequency and scan frequency is generally unable to achieve a satisfactory reduction in moiré because, on the one hand, a decrease in screen frequency reduces the resolution of the image and, on the other hand, an increase in scan frequency greatly increases the amount of resources required to process and store the scanned representation. In some applications such as high-quality printed publications, screen frequencies in excess of 200 lines per inch (about 79 lines per centimeter) are used, making it essentially impossible to reduce moiré by merely increasing the scan frequency.

A careful selection of screen angle is generally unable to achieve a satisfactory reduction in moiré because the angle is difficult to select precisely in many applications. Precise selection is difficult because the relative orientation of the screened image with respect to the orientation of the scanning apparatus is difficult to control precisely. The problem is even greater in color applications where the screen angle for three or more colors must be very carefully selected.

A variety of techniques exist that can reduce moiré by reducing the regularity of the pattern in either or both the image screen and the scan. These techniques usually are not satisfactory because it is often impossible to control how the screen image is produced and irregular scanning patterns are difficult to implement.

A variety of other techniques attempt to reduce moiré by using so called stochastic screens to introduce a degree of randomness in either a scanned representation or a printed replica of a scanned representation. These techniques are not attractive because considerable processing resources are required to perform the quasi-stochastic processes needed to implement the stochastic screens. In addition, a considerable amount of random-access memory (RAM) is required for these processes to operate on the scanned representations.

A variety of other techniques reduce moiré by applying a low-pass filter to the scanned representation. If a filter is applied uniformly to the representation, however, the degree of filtering required to achieve an acceptable reduction in moiré usually results in an unacceptable reduction in resolution. For this reason, a number of adaptive filtering techniques have been developed. According to one technique, different filters are applied to a scanned representation and weighted combinations of the filter outputs are formed according to whether edges or other high-spatial-frequency components are present in the image. This techniques are sometimes well suited for certain specialized applications like enhancing X-ray images for examination by trained medical personnel but are not as well suited for high-quality reproduction of arbitrary images.

According to another technique, the scanned representation is filtered by a spatially-variant filter that is adapted according to the presence and orientation of edges in the image. This technique is not attractive because considerable processing resources are required to implement the spatially-variant filters. In addition, considerable memory is required for these filters to operate on the scanned representations.

All known techniques for reducing moiré are deficient because they cannot achieve high-quality reproduction of all types of screened images using essentially any screen and scan frequency and/or screen angle for display by essentially any display technique. Furthermore, as mentioned above, implementation of many of these techniques require an amount of processing and memory resources that cannot be provided inexpensively. These known techniques also do not work well for images that include periodic structures of multiple screen frequencies.

DISCLOSURE OF INVENTION

It is an object of the present invention to provide for a method and apparatus to process scanned representations of screened images, such as screened halftone images, in a manner that is independent of screen frequency, scan frequency and screen angle, to generate high-quality renditions that are substantially free of visible moiré. The advantages of the present invention may be realized in low-cost implementations that require only modest processing and memory resources.

According to teachings of the present invention, a screened image is reproduced with reduced moiré by analyzing a plurality of representations of the screened image to detect edges, where each representation has a respective resolution; generating a control signal for each region of the screened image, where the control signal is generated for a respective region according to which of the representations have edges detected in that respective region; and generating an output signal reproducing the screened image with reduced moiré by filtering the screened image, where a respective region is filtered by an amount that varies according the control signal for the respective region.

One embodiment of an apparatus that may be used to carry out the present invention comprises a plurality of filters, each filter having a size, a filter output, and a filter input receiving a first input signal conveying a screened image; a plurality of input terminals, each input terminal receiving a plurality of second input signals representing the image in respective resolutions; a plurality of edge detectors, each of the edge detectors having a detector input coupled to a respective input terminal and having a detector output; a controller having a control output and a plurality of control inputs, each control input coupled to the detector output of a respective edge detector; a selector having a selector-control input, a plurality of selector inputs and a selector output, the selector-control input coupled to the control output of the controller and a respective selector input coupled to the filter output of a respective filter; and an output terminal coupled to the selector output to convey an output signal reproducing the image in a form having reduced moiré.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Overview

Figure 1:
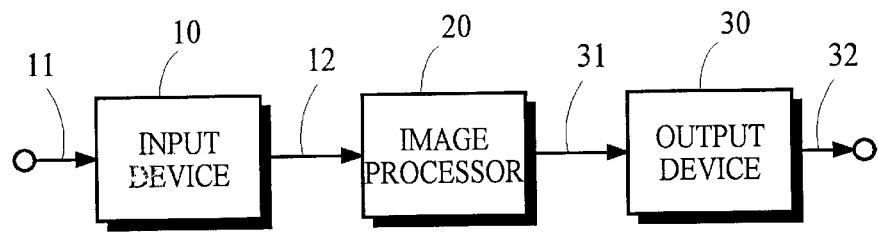
FIG. 1 is a functional block diagram illustrating the major components in an image reproduction system.

FIG. 1 illustrates major components in a typical image reproduction system. Input device 10 receives from path 11 signals representing an original screened image and generates along path 12 an input representation of this image. Image processor 20 receives this input representation from path 12 and, in response, generates along path 31 an output representation of the original image. Output device 30 receives this output representation from path 31 and, in response, generates along path 32 a rendition of the original image. The present invention is directed toward improving the quality of this rendition by reducing moiré.

Input device 10 may be a scanner or camera, for example. If input device 10 is an optical scanner, the signals received from path 11 are optical in nature and the input representation generated along path 12 conveys values of optical samples taken at locations along multiple scan lines.

Output device 30 may be essentially any type of printer, plotter or display. If output device 30 is an ink-jet printer, for example, the rendition generated along path 32 is the printed image. If output device 30 is a cathode ray tube (CRT) or thin-film transistor (TFT) display, for example, the rendition generated along path 32 is the image formed on the display device. Throughout this disclosure, more particular mention will be made of printers; however, many of the principles and features of the present invention may be applied in systems incorporating other types of output devices.

Image processor 20 processes the input representation to generate the output representation, which is intended to be a high-fidelity rendition of the original image that is substantially free of visible moiré. Image processor 20 may be implemented in a variety of ways including by software and/or hardware in a general-purpose computer.

Figure 2:
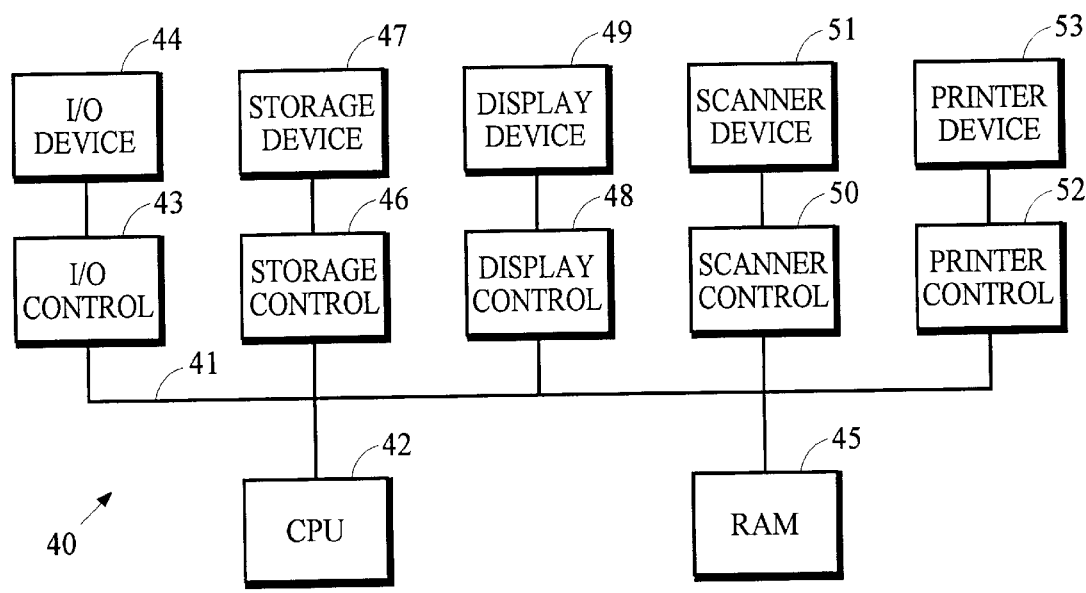
FIG. 2 is a functional block diagram illustrating several components in a typical personal computer system that is suitable for carrying out various aspects of the present invention.

FIG. 2 is a functional block diagram of a typical personal computer system 40 that may be used to implement an image reproduction system according to the present invention. CPU 42 provides computing resources. I/O control 43 represents an interface to I/O device 44 such as a keyboard or mouse. RAM 45 is system random access memory (RAM). Storage control 46 represents an interface to storage device 47 that includes a storage medium such as magnetic tape or disk, or an optical medium. The storage medium may be used to record programs of instructions for operating systems, utilities and applications, and may include embodiments of programs that implement various aspects of the present invention. Display control 48 provides an interface to display device 49. Scanner control 50 represents an interface to scanner device 51 that is an input device like an optical scanner. Printer control 52 represents an interface to printer device 53 that is an output device like an ink jet printer. Devices like scanner device 51 may serve as input device 10 and devices like display device 49 or printer device 53 may serve as output device 30. Other components shown in the figure may be used to implement image processor 20.

In the embodiment shown, all major system components connect to bus 41 which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. Preferably, display control 48 connects to a high-bandwidth bus to improve the speed of display. A bus architecture is not required to practice the present invention.

The functions required to practice various aspects of the present invention can be performed by components that are implemented in a wide variety of ways including discrete logic components, one or more ASICs and/or program-controlled processors. The manner in which these components are implemented is not important to the present invention. For example, the operations required to practice the present invention can be implemented in a computer system such as computer system 40 by programs of instructions that are stored in storage device 47, copied into RAM 45 and executed by CPU 42. Various aspects of the present invention can be conveniently implemented in a type of program known as a device driver. Such software may be conveyed by a variety machine readable medium including magnetic tape, magnetic disk, optical disc, and baseband or modulated communication paths throughout the spectrum including from supersonic to ultraviolet frequencies. Various aspects can also be implemented in display device 49 or printer device 53 using processing circuitry such as ASICs, general-purpose integrated circuits, microprocessors controlled by programs embodied in various forms of read-only memory (ROM) or RAM, and other techniques.

Figure 3:
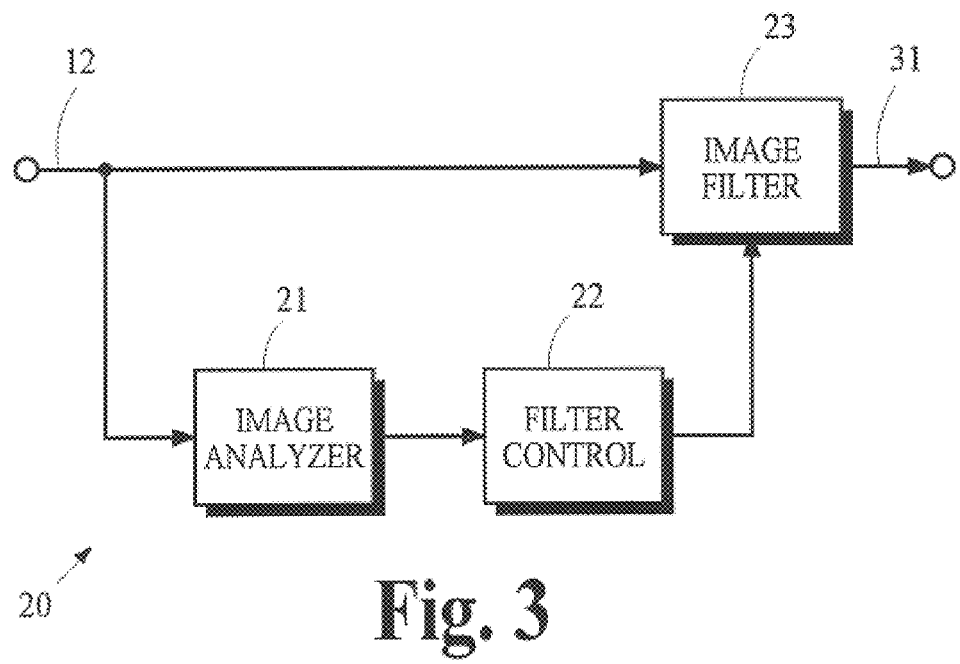
FIG. 3 is a functional block diagram illustrating several components in a device according to one embodiment of the present invention.

FIG. 3 is a functional block diagram illustrating several major components in image processor 20. Image analyzer 21 receives from path 12 the input representation of an original image and analyzes information derived from this input representation to classify regions of the image according to image content. Filter control 22 receives the results of image analyzer 21 and generates a filter-control signal that is used to control the operation of image filter 23. Image filter 23 applies a two-dimensional filter of varying size to the input representation received from path 12 to generate along path 31 an output representation that renders the original image in a form that is substantially free of visible moiré. The kernel size, or number of taps, of this two-dimensional averaging filter is varied according to the control signal received from filter control 22. These components are discussed in more detail below.

Moiré

Figure 4A:
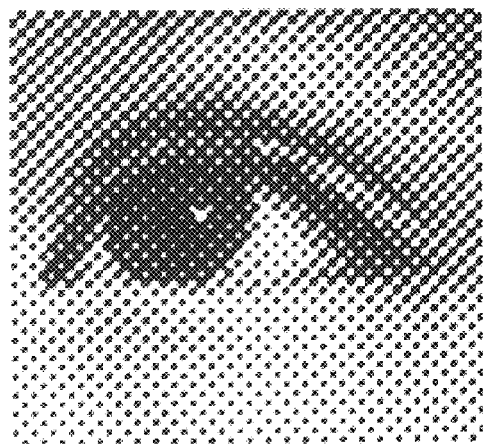
FIG. 4A illustrates an enlargement of a portion of a screened halftone image showing the pattern of the dots that are used to form the image.
Figure 4B:
FIG. 4B illustrates a rendition of a scanned representation of a screened image that was generated without benefit of the present invention and that contains large amounts of moiré.

FIG. 4A illustrates an enlargement of a portion of a screened halftone image showing the pattern of the dots that are used to form the image. FIG. 4B illustrates a rendition of a scanned representation of this image that was generated without benefit of the present invention. This rendition contains moiré that is very visible. The present invention is directed toward generating a rendition that is free, or at least substantially free, of visible moiré.

Figure 5:
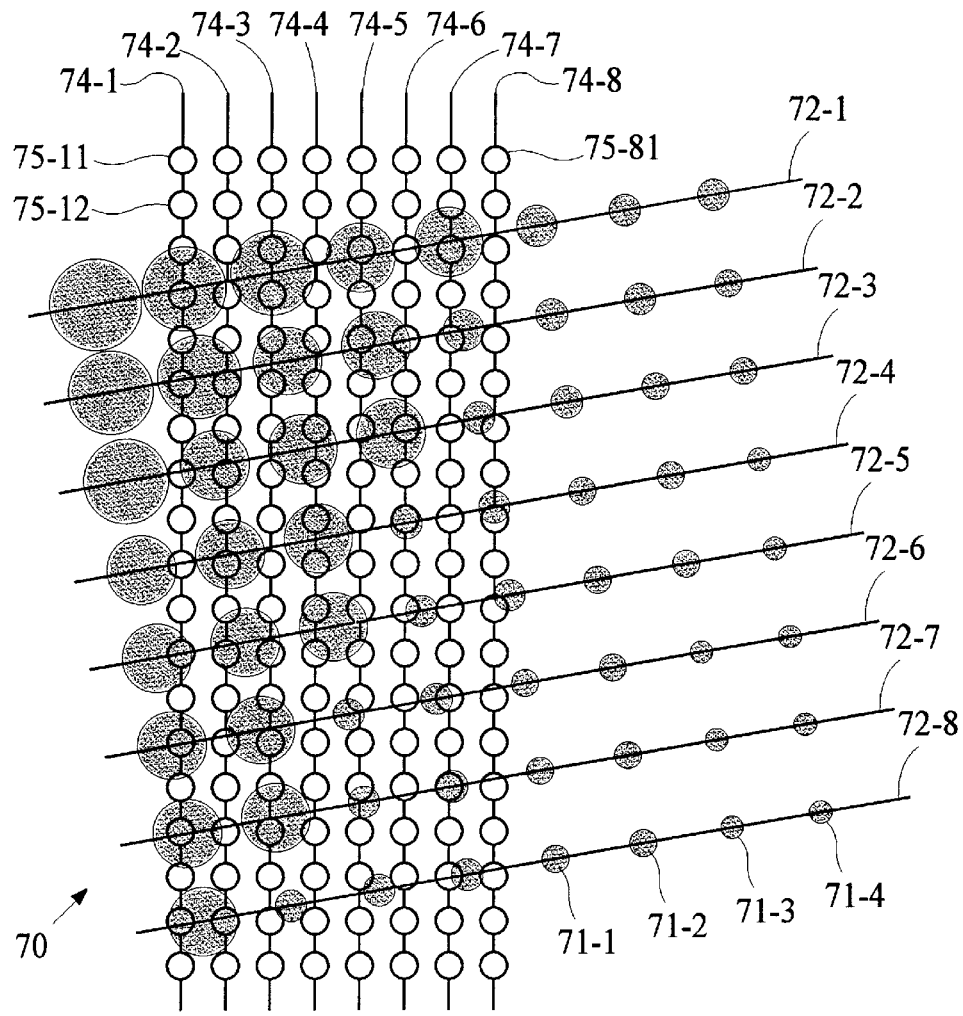
FIG. 5 is a schematic illustration of a portion of a hypothetical screened halftone image showing the placement of halftone dots and the orientation scanning lines used to generate a scanned representation of the image.

FIG. 5 is a schematic illustration of a portion of a hypothetical screened halftone image 70. This illustration shows halftone dots 71 having centers that define rows 72. Generally, the dots in a screened halftone image are solid in color and vary in size to represent various levels of color or shading in an image. In the illustration, however, dots 71 are stippled for illustrative clarity. A series of scanning lines 74 represent lines along which samples 75 of the halftone image are taken to generate a scanned representation of the halftone image.

The circle for each sample 75 represents an area of the image that is detected by an optical sensor of a scanner device. The circles 75 imply that the areas detected by the optical sensors are uniform with a very sharp transition between the areas that are detected and the areas that are not detected. In practice, however, the sensitivity of each optical sensor, often referred to as a modulation transfer function (MTF), is not uniform and the transition or "rolloff" between sensed areas and non-sensed areas is not infinitely steep. The MTF for many practical optical sensors is substantially Gaussian in shape and varies as a function of distance from the center of each scanned area. Although the nature of the MTF can affect the performance of an image reproduction system, it is not critical to the concepts underlying the present invention.

The resolution of the rows 72, denoted herein as $f_{SCREEN}$, is the screen frequency of the screened halftone image. Common screen frequencies for halftone images vary from about 85 to about 300 lines per inch (about 33 to about 118 lines per centimeter) to over 1200 dots per inch (about 470 dots per centimeter) in high-quality printed publications. The resolution of the scanning samples 75, denoted herein as $f_{SCAN}$, is the scan frequency. Common scan frequencies vary from about 100 to about 1000 dots per inch (about 39 to about 393 dots per centimeter) although much higher scan frequencies are possible. The complement of the angle between rows 72 and scanning lines 74, denoted as $\theta_{SCREEN}$, is the screen angle. The present invention is not limited to any particular range of screen frequencies, scan frequencies, and screen angles.

The examples shown in various figures including FIG. 5 and discussed in the following text assume the halftone image dots and the scanning samples all have centers that define uniformly-spaced orthogonal grids. These assumptions are made to simplify the illustrations and the associated discussion; however, the present invention is not so limited. For example, the present invention may be applied to images with dots having centers that define grids of essentially any orientation and which may have a spacing that varies throughout the image. In practice, however, screened halftone images are generally composed of dots with centers along uniformly spaced rows and columns that are orthogonal, as shown in FIG. 4A, and scanning samples generally have centers located at the intersections of a uniformly-spaced orthogonal grid.

Spatial Domain

Moiré may be described in the spatial domain as an interference pattern that is affected by the scan frequency, the screen frequency, the screen angle, the optical sensor MTF, and a variety of characteristics of the process used to print or display a rendition of the original image. The effects of scan frequency, screen frequency and screen angle are discussed below in some detail to help explain the principles underlying the present invention. The effects of optical sensor MTF and print/display characteristics are not discussed to any extent because an understanding of these effects does not provide much additional help in explaining the present invention. Because these effects can affect the performance of an image reproduction system, however, a few comments are warranted.

An image reproduction system that uses optical sensors that have MTF with a gradual rolloff manifests less moiré because the sensor provides an optical low-pass filter but these systems also generate a blurred representation of the image. Consequently, the use of optical sensors with MTF having a sharp rolloff is generally preferred.

The characteristics of the device or the process to display or print the rendition also affects the visibility of moiré. The size and resolution of the dots used by a printer or display is one example. As another example, if a device like an ink-jet printer is used to print the rendition, a variety of techniques like error diffusion and stochastic screening may be used to reduce moiré by introducing a degree of randomness into the structure of the rendition. If a device like a cathode ray tube is used, however, these techniques cannot be used because the locations of the dots used to form the rendition are fixed. The characteristics of the ink and paper can also affect the visibility of moiré. For example, paper made of fibers that absorb ink and blur the pattern of printed dots reduces moiré but also blurs the image. Neither the optical sensor MTF nor display/print characteristics are critical to the present invention.

Figure 6:
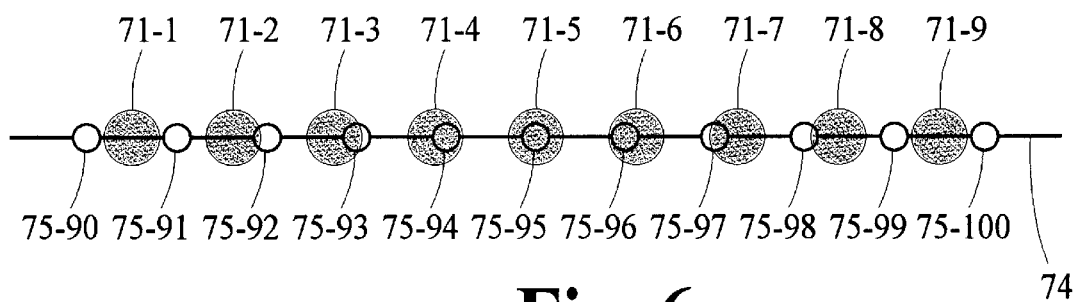
FIG. 6 is a schematic illustration of a portion of one scan line for a hypothetical screened halftone image showing variations in sampled values that manifest themselves as moiré.

FIG. 6 provides a schematic illustration of a row of dots and a line of scanning samples. In this example, samples 75 along scan line 74 are aligned with the row of dots 71 so the screen angle is equal to zero degrees. Because dots 71 shown in FIG. 6 are uniform in size, these dots represent a portion of a halftone image that has a uniform shade. Nevertheless, the values of samples 75 are not equal but instead vary periodically. For simplicity, this example assumes an ideal MTF for the optical sensors that is uniform throughout the areas represented by the circles labeled 75 and has an infinitely steep rolloff at the circle edges.

Dot 71-1 lies between samples 75–90 and 75–91 and does not overlap any part of either sample; therefore, the values for samples 75–90 and 75–91 are zero. The value of sample 75–92 is about 0.17 because about one-sixth of this sample overlaps dot 71-2. The value of sample 75–93 is about 0.3 because slightly more than one-fourth of this sample overlaps dot 71-3. The values of samples 75–94, 75–95 and 75–96 are one because these samples completely overlap dots 71-4, 71-5 and 71-6, respectively. Samples 71–97 and 75–98 have values of approximately 0.3 and 0.17, respectively. The next nine samples beginning with sample 75–99 have values that repeat this sequence.

If adjacent rows of dots are identical to this row, which represents a uniformly shaded region in a screened halftone image, the same variation in sampled values would occur for these rows as well. These variations would manifest themselves as moiré or ripple-like patterns that vary from zero percent shading for sample values equal to zero to one hundred percent shading for values equal to one.

Frequency Domain

Figure 7:
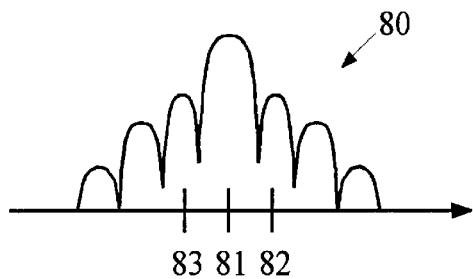
FIG. 7 is an illustration of a hypothetical frequency-domain representation of a screened halftone image.
Figure 8:
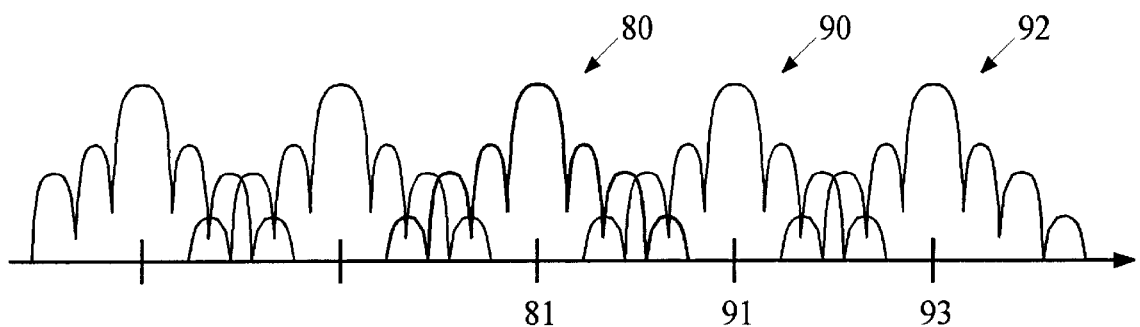
FIG. 8 is an illustration of a hypothetical frequency-domain representation of a scanned screened halftone image showing harmonics of the scan frequency.

Moiré may be described in the frequency domain as aliased spectral components that have frequency characteristics dependent on the scan frequency, the screen frequency and the screen angle. FIG. 7 illustrates a hypothetical one-dimensional baseband frequency-domain representation 80 of a row of dots in a screened halftone image such as that which can be obtained from a Discrete Walsh-Hadamard Transform (DWHT), a Discrete Fourier Transform (DFT) or other spatial-domain to frequency-domain transform. Peaks in the baseband representation exist at zero frequency 81, at the screen frequency 82, at the negative screen frequency 83, and at several harmonics of the screen frequency. FIG. 8 illustrates a one-dimensional frequency-domain representation of a row of scanned dots in a screened halftone image. As shown in the figure, scanning causes the baseband representation 80 to be repeated at harmonics of the scanning frequency. For example, representation 90 is centered at scan frequency 91 and representation 92 is centered at the first harmonic 93 of the scan frequency. Other representations are centered at higher harmonics of the scan frequency and at the negative harmonic frequencies.

The illustration of FIG. 8 assumes the frequency-domain representations are generated from transformations of optical samples that are ideal points because the representations at the scan frequency and its harmonics are shown as exact replications of the baseband representation. For actual images, these representations would not be exact replications because the optical sample sizes are not ideal points but instead are the areas detected by the optical sensors. This assumption of exact replicas simplifies the following discussion but it does not alter the principles underlying the present invention.

Representations centered at adjacent harmonics of the scan frequency overlap to some extent. In the example shown in FIG. 8, the fourth sidelobe on the lower-frequency side of representation 90 occurs at a frequency that is lower than the third and fourth sidelobes on the higher-frequency side of the baseband representation 80. The spectral components in these two representations do not have a distinct identity but instead are inseparably combined in the overall frequency-domain representation of the halftone image. Within this overlap region, the spectral components of representation 90 are aliases of the spectral components of baseband representation 80. The resulting distortion of the frequency-domain representation, referred to as aliasing distortion, manifests itself as moiré.

A frequency-domain representation such as that illustrated in FIG. 8 helps explain why moiré can be reduced using any of several techniques. Moiré can be reduced by reducing the screen frequency because, as the screen frequency is reduced, baseband representation 80 becomes narrower and the regions of overlap between adjacent representations decrease. Unfortunately, the resolution of the image is also reduced, resulting in a blurred image. Moiré can be reduced by increasing the scan frequency because, as the scan frequency is increased, the interval between adjacent harmonics of the scan frequency increases and the regions of overlap decreases. As mentioned above, however, this solution is not attractive because it increases the amount of resources required to process and store the scanned image and, in some applications, the screen frequency is so high that the scanning frequency cannot be increased enough to achieve enough reduction in moiré. Moiré can also be reduced by applying a variety of spatially-variant low-pass and band-pass filters to the baseband representation because the most objectionable moiré is caused by aliased components that are higher in frequency; however, this approach has not been completely satisfactory because it attenuates desirable high-frequency components and because considerable resources are usually required to implement and adapt the filters.

In a preferred embodiment, the present invention is able to reduce moiré in a manner that is independent of screen and scan frequencies by applying an adaptive-length averaging filter that requires a very low amount processing resources to implement and can be adapted very efficiently by a novel hierarchical edge detector. This edge detector is discussed below after the principles underlying the averaging filter are explained.

Averaging Filter

A Discrete Walsh-Hadamard Transform (DWHT) is assumed in the following discussion but the principles illustrated in this discussion apply to a wide variety of transforms. It should be understood that spatial-domain-to-frequency-domain transforms are not needed to practice the present invention. This discussion of transforms is provided merely to help explain some of the principles underlying the use of averaging filters. A few one-dimensional examples are discussed first.

A one-dimensional spatial-domain-to-frequency-domain transform may be represented by matrix multiplication $$\vec{Y} = \bar{A} \cdot \vec{X} \quad (1)$$

where $\vec{Y}$=block or vector of N frequency-domain transform coefficients, $\bar{A}$=N×N transformation matrix, and $\vec{X}$=block or vector of N sample values.

If N=2, a vector of two transform coefficients $y_0$ and $y_1$ may be obtained by multiplying the transformation matrix $\bar{A}$ with a block or vector of two samples $x_0$ and $x_1$. Referring to FIG. 6, a pair of samples may be grouped to form a block of samples where $x_0$ is the value of sample 75–90 and $x_1$ is the value of sample 75–91. Another block may be formed by grouping samples 75–92 and 75–93.

The transformation matrix for a 2-point DWHT transform is:

$$\bar{A} = \{a_{i,j}\}_{i,j=0 \text{ to } 1} = \begin{bmatrix} \vec{a}_0^T \\ \vec{a}_1^T \end{bmatrix} = \frac{1}{\sqrt{2}} \begin{bmatrix} 1 & 1 \\ 1 & -1 \end{bmatrix} \quad (2)$$

Each row of the matrix is the transposition of a vector. The transformation matrix of a DWHT is real and orthogonal and the rows and columns of this matrix form a set of orthogonal "basis vectors" for the transform.

For simplicity, we ignore the normalizing factor outside the matrix, allowing equation 1 to be rewritten as the system of equations:

$$y_0 = a_{00} \cdot x_0 + a_{01} \cdot x_1 = x_0 + x_1 \quad (3a)$$

$$y_1 = a_{10} \cdot x_0 + a_{11} \cdot x_1 = x_0 - x_1 \quad (3b)$$

Transform coefficient $y_0$ corresponds to the amplitude of the baseband representation 80. Transform coefficient $y_1$ corresponds to the amplitude of the representation 90 at the scan frequency.

As explained above, aliasing can be reduced if the amplitude of the frequency-domain representation at the scan frequency is zero. This may be expressed as the transform coefficient $y_1$ being equal to zero. From equation 3b, this is achieved when the value of sample $x_0$ equals the value of sample $x_1$.

In general, of course, the values of two adjacent samples are not always equal. By applying an appropriate filter to the samples, however, two modified sample values $x'_0$ and $x'_1$ can be derived that are equal. This can be accomplished in a variety of ways but a simple way is to take the average of the two samples by applying an averaging filter similar to $$x'_0 = x'_1 = \frac{x_0 + x_1}{2}. \quad (4)$$

By applying such an averaging filter to the blocks of samples, frequency-domain representation 90 centered about the scan frequency can be eliminated, thereby reducing aliasing effects.

This effect may be extended to larger blocks of samples. Referring to FIG. 6, if N=4, four samples are grouped to form a block where $x_0$, $x_1$, $x_2$ and $x_3$ are the values of samples 75–90 through 75–93, respectively. A subsequent block may be formed by grouping samples 75–94 and 75–97.

The basis vectors and the transformation matrix for a 4-point DWHT transform is:

$$\bar{A} = \{a_{i,j}\}_{i,j=0 \text{ to } 3} = \begin{bmatrix} \vec{a}_0^T \\ \vec{a}_1^T \\ \vec{a}_2^T \\ \vec{a}_3^T \end{bmatrix} = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (5)$$

As before, we ignore the normalizing factor outside the matrix to simplify the following expressions. The relative value of the elements in each row of the matrix are illustrated by the arrows in FIG. 9A through 9D, respectively.

The matrix multiplication in equation 1 may be rewritten as the system of equations:

$$y_0 = a_{00} \cdot x_0 + a_{01} \cdot x_1 + a_{02} \cdot x_2 + a_{03} \cdot x_3 = x_0 + x_1 + x_2 + x_3 \quad (6a)$$

$$y_1 = a_{10} \cdot x_0 + a_{11} \cdot x_1 + a_{12} \cdot x_2 + a_{13} \cdot x_3 = x_0 + x_1 - x_2 - x_3 \quad (6b)$$

$$y_2 = a_{20} \cdot x_0 + a_{21} \cdot x_1 + a_{22} \cdot x_2 + a_{23} \cdot x_3 = x_0 - x_1 - x_2 + x_3 \quad (6c)$$

$$y_3 = a_{30} \cdot x_0 + a_{31} \cdot x_1 + a_{32} \cdot x_2 + a_{33} \cdot x_3 = x_0 - x_1 + x_2 - x_3 \quad (6d)$$

Referring to FIG. 8, transform coefficient $y_0$ corresponds to the amplitude of baseband representation 80. Transform coefficient $y_1$ corresponds to the amplitude of frequency-domain representation 90 at the scan frequency. Transform coefficient $y_2$ corresponds to the amplitude of representation 92 at the first harmonic of the scan frequency and transform coefficient $y_3$ corresponds to the amplitude of the representation at the second harmonic of the scan frequency.

Figure 9A:
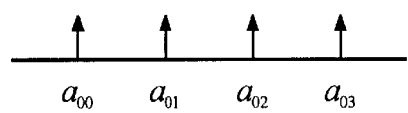
FIGS. 9A through 9D are hypothetical graphical illustrations of the relative values of elements in the basis vectors of a 4-point Discrete Walsh-Hadamard Transform.
Figure 9B:
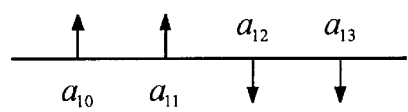
Figure 9C:
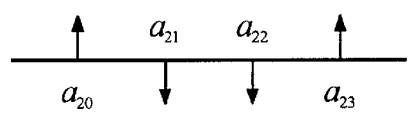
Figure 9D:
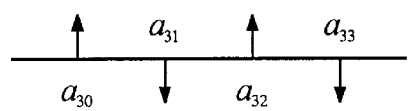
Figure 9E:
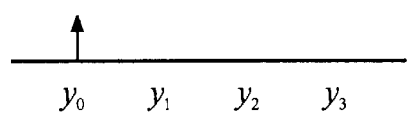
FIG. 9E is a hypothetical graphical illustration of the resultant frequency-domain coefficients of an averaging filter.

Aliasing may be reduced if the amplitude of the frequency-domain representations at the scan frequency and its first two harmonics are zero. This may be expressed as transform coefficients $y_1$ through $y_3$ being equal to zero, as illustrated in FIG. 9E. It can be seen from equations 6b through 6d that this is achieved when the values of samples $x_0$ through $x_3$ are all equal. By applying an appropriate filter to the samples, modified sample values $x'_0$ through $x'_3$ can be derived that are equal. This can be accomplished in a variety of ways but a simple way is to take the average of the samples, or $$x'_0 = x'_1 = x'_2 = x'_3 = \frac{x_0 + x_1 + x_2 + x_3}{4}. \quad (7)$$

By applying such an averaging filter to the blocks of samples, the frequency-domain representations centered about the scan frequency and two harmonics can be eliminated, thereby reducing aliasing effects.

These one-dimensional examples may be applied to two-dimensional representations by using a two-dimensional transform that is separable into two one-dimensional transforms. For example, one transform is applied to blocks of samples formed along the scan lines and a second transform is applied to blocks of samples formed orthogonal to the scan lines. A set of basis matrices for a two-dimensional separable DWHT may be obtained by cross-multiplying the basis vectors of the component one-dimensional transforms:

$$\overline{A}_{i,j} = [\vec{a}_i \cdot \vec{a}_j^T] \text{ for } 0 \le i, j < N \tag{8}$$

For example, a set of four basis matrices may be formed for a 2×2 DWHT transform as follows:

$$\overline{A}_{00} = \vec{a}_0 \cdot \vec{a}_0^T = \frac{1}{\sqrt{2}}\begin{bmatrix}1\\1\end{bmatrix} \cdot \frac{1}{\sqrt{2}}[1 \ 1] = \frac{1}{2}\begin{bmatrix}1 & 1\\1 & 1\end{bmatrix} \tag{9a}$$

$$\overline{A}_{01} = \vec{a}_0 \cdot \vec{a}_1^T = \frac{1}{\sqrt{2}}\begin{bmatrix}1\\1\end{bmatrix} \cdot \frac{1}{\sqrt{2}}[1 \ -1] = \frac{1}{2}\begin{bmatrix}1 & -1\\1 & -1\end{bmatrix} \tag{9b}$$

$$\overline{A}_{10} = \vec{a}_1 \cdot \vec{a}_0^T = \frac{1}{\sqrt{2}}\begin{bmatrix}1\\-1\end{bmatrix} \cdot \frac{1}{\sqrt{2}}[1 \ 1] = \frac{1}{2}\begin{bmatrix}1 & 1\\-1 & -1\end{bmatrix} \tag{9c}$$

$$\overline{A}_{11} = \vec{a}_1 \cdot \vec{a}_1^T = \frac{1}{\sqrt{2}}\begin{bmatrix}1\\-1\end{bmatrix} \cdot \frac{1}{\sqrt{2}}[1 \ -1] = \frac{1}{2}\begin{bmatrix}1 & -1\\-1 & 1\end{bmatrix} \tag{9d}$$

This two-dimensional transform may be implemented by applying each basis matrix to a 2×2 block of samples and combining the results to obtain a matrix of frequency-domain coefficients:

$$\overline{Y} = \{y_{i,j}\}_{i,j=0 \text{ to } 3} = \sum_{k=0}^{N-1}\sum_{l=0}^{N-1} \overline{Y}_{kl} = \sum_{k=0}^{N-1}\sum_{l=0}^{N-1} (\overline{A}_{kl} \cdot \overline{X}) \tag{10}$$

Figure 10:
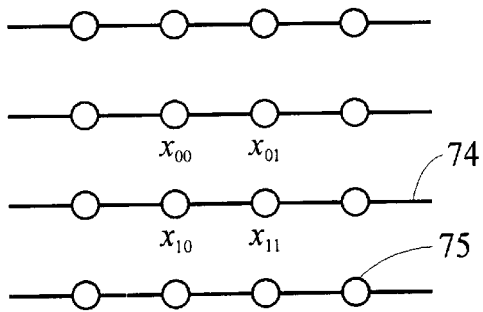
FIG. 10 is a schematic illustration of samples in several scan lines.

For example, the 2×2 DWHT may be applied to a 2×2 block of samples by multiplying the sample block by each basis matrix $\overline{A}_{kl}$ to obtain a set of interim matrices that are combined to obtain the $\overline{Y}$ coefficient matrix. Referring to FIG. 10, pairs of samples 75 from each of two scan lines 74 form a 2×2 block of samples. Each group includes samples denoted $x_{00}$, $x_{01}$, $x_{10}$ and $x_{11}$.

In a similar manner discussed above for the one-dimensional case, aliasing may be reduced if the amplitude of the three frequency-domain representations adjacent to the baseband representation are zero. This may be expressed as the transform coefficients $y_{01}$, $y_{10}$ and $y_{11}$ being equal to zero. From equations 9a through 9d and 10, it can be seen that this is achieved when the values of the sample $x_{00}$, $x_{01}$, $x_{10}$ and $x_{11}$ are equal. By applying an appropriate filter to the samples, modified sample values $x'_{00}$, $x'_{01}$, $x'_{10}$ and $x'_{11}$ can be derived that are equal. This can be accomplished in a variety of ways but a simple way is to take the average of the samples, represented as $$x'_{00} = x'_{01} = x'_{10} = x'_{11} = \frac{x_{00} + x_{01} + x_{10} + x_{11}}{4}. \tag{11}$$

By applying such an averaging filter to the samples of an image, the frequency-domain representations adjacent to the baseband representation can be eliminated, thereby reducing aliasing effects and the resulting moiré.

Figure 11A:
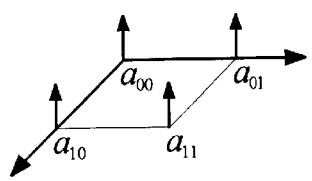
FIGS. 11A through 11D are hypothetical graphical illustrations of the relative values of elements in the basis matrices of a 2×2 Discrete Walsh-Hadamard Transform.
Figure 11B:
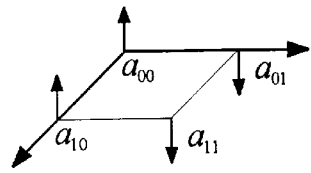
Figure 11C:
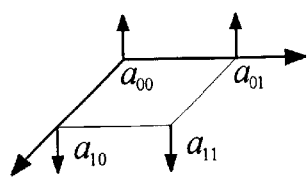
Figure 11D:
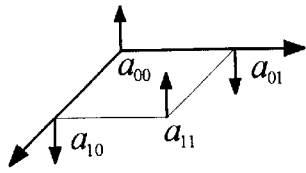
Figure 11E:
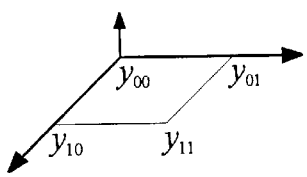
FIG. 11E is a hypothetical graphical illustration of the resultant frequency-domain coefficients of a two-dimensional averaging filter.

FIGS. 11A through 11D, respectively, illustrate graphically the relative values of the coefficients in the four basis matrices $\overline{A}_{00}$ through $\overline{A}_{11}$. By taking the average of the four samples, the basis matrices combine to cancel all of the representations except for the baseband representation corresponding to coefficient $y_{00}$, as shown in FIG. 11E.

Similar effects can be achieved for larger blocks of samples by using larger averaging filters. For example, a 4×4 averaging filter can be applied to 4×4 blocks of samples to eliminate the fifteen frequency-domain representations adjacent to the baseband representation.

The discussion thus far has made no assumption regarding the screen angle. It can be shown that the screen angle is not important because a rotation of the image dots with respect to the scan lines in the spatial domain has a corresponding rotation of the frequency-domain representations in the frequency domain.

Hierarchical Edge Detection And Filter Control

The averaging filter described above is very efficient and provides good moiré reduction but, unless it is applied in some adaptive manner, the reduction in moiré is accompanied by a reduction in spatial resolution of the image. Preferred embodiments of the present invention adapt a filter according to an analysis of a hierarchy of image resolutions.

Referring to FIG. 3, image analyzer 21 receives the input representation of an original image from path 12 and analyzes other representations at various resolutions that are derived from this input representation. Regions in the image are classified as having "global edges" if an edge or other high-frequency content is detected in representations for all resolutions, and the regions are classified as having edges that are progressively more "local" as the edge is detected in fewer of the low resolution representations. Filter control 22 receives the results of image analyzer 21 and generates a filter-control signal that is used to control the operation of image filter 23. In one embodiment, filter 23 applies no filtering to regions that have global edges and applies averaging filters of progressively greater length to regions with edges that are progressively more local.

Hierarchy of Resolutions

Figure 12:
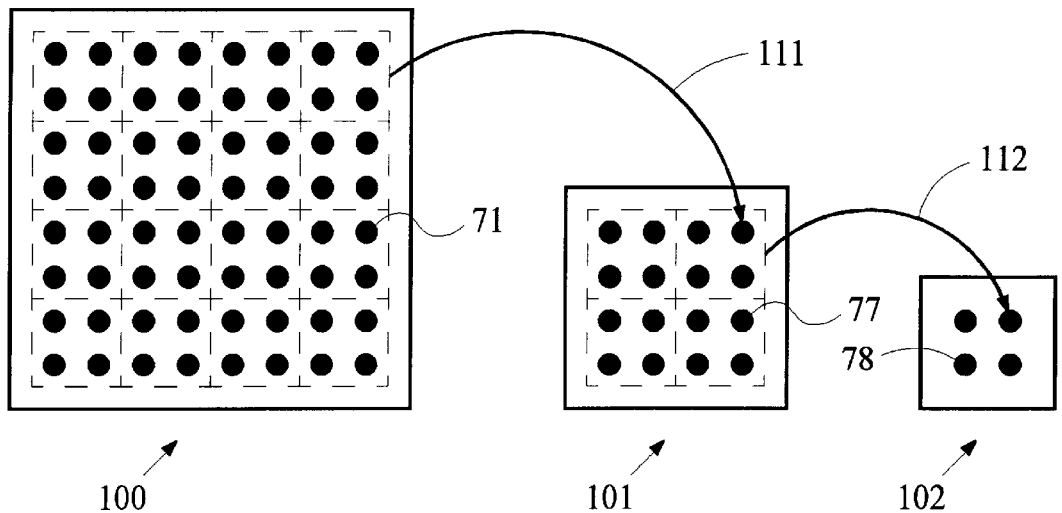
FIG. 12 is a hypothetical graphical illustration of a hierarchy of representations having different resolutions.

Image analyzer 21 analyzes a hierarchy of two or more image resolutions. FIG. 12 illustrates a hierarchy of three image resolutions. In a preferred embodiment, the highest resolution 100, referred to as hierarchical level 0, has the same resolution as the input representation received from path 12. Representation 101 at the next lower resolution, referred to as level 1, has one-half the resolution of level 0. Similarly, resolution 102 at level 2 has one half the resolution of level 1. The hierarchy may be extended to additional levels where each succeeding level has a resolution that is reduced by one-half. Each image element or dot 77 in representation 101 at level 1 is formed from a 2×2 group of dots 71 in representation 100 at level 0. Similarly, each dot 78 in representation 102 at level 2 is formed from a 2×2 group of dots 77 in representation 101.

The hierarchy of representations may be obtained in a variety of ways. One way obtains each representation in the hierarchy directly from a scanned representation having the appropriate resolution. Another way derives the hierarchical representations from a single high-resolution representation by forming each dot in one level from the average of a respective 2×2 group of dots in the next higher level. For example, referring to FIG. 12, arrow 111 represents the process of applying a 2×2 averaging filter to dots 71 and arrow 112 represents the process of applying a 2×2 averaging filter to dots 77.

Edge Detection

Each level of representation in the hierarchy is analyzed to detect the presence of high-frequency content such as edges. This may be accomplished in a wide variety of ways such as a Sobel edge detector. In one embodiment, a Sobel edge detector obtains two interim values $E_h$ and $E_v$ from the convolution of two matrices. One interim value $E_h$ indicates the presence of horizontal edges and is obtained from $$E_h = \overline{S}(x) \overline{X} \tag{12a}$$

where $$\overline{S} = \begin{bmatrix} -1 & 0 & 1 \\ -2 & 0 & 2 \\ -1 & 0 & 1 \end{bmatrix}$$

$\overline{X}$=a 3×3 group of dots in the image being analyzed, and ⊗ denotes a convolution operation.

The second interim value $E_v$ indicates the presence of vertical edges and is obtained from $$E_v = \overline{S}^T \otimes \overline{X}. \qquad (12b)$$

An edge is detected whenever a value E derived from these two interim values exceeds a threshold Th, or $$E = \sqrt{E_h^2 + E_v^2} > Th. \qquad (13)$$

An alternative edge detector that requires fewer processing resources detects an edge according to $$E = \max(|E_h|, |E_v|) > Th. \qquad (14)$$

Figure 13:
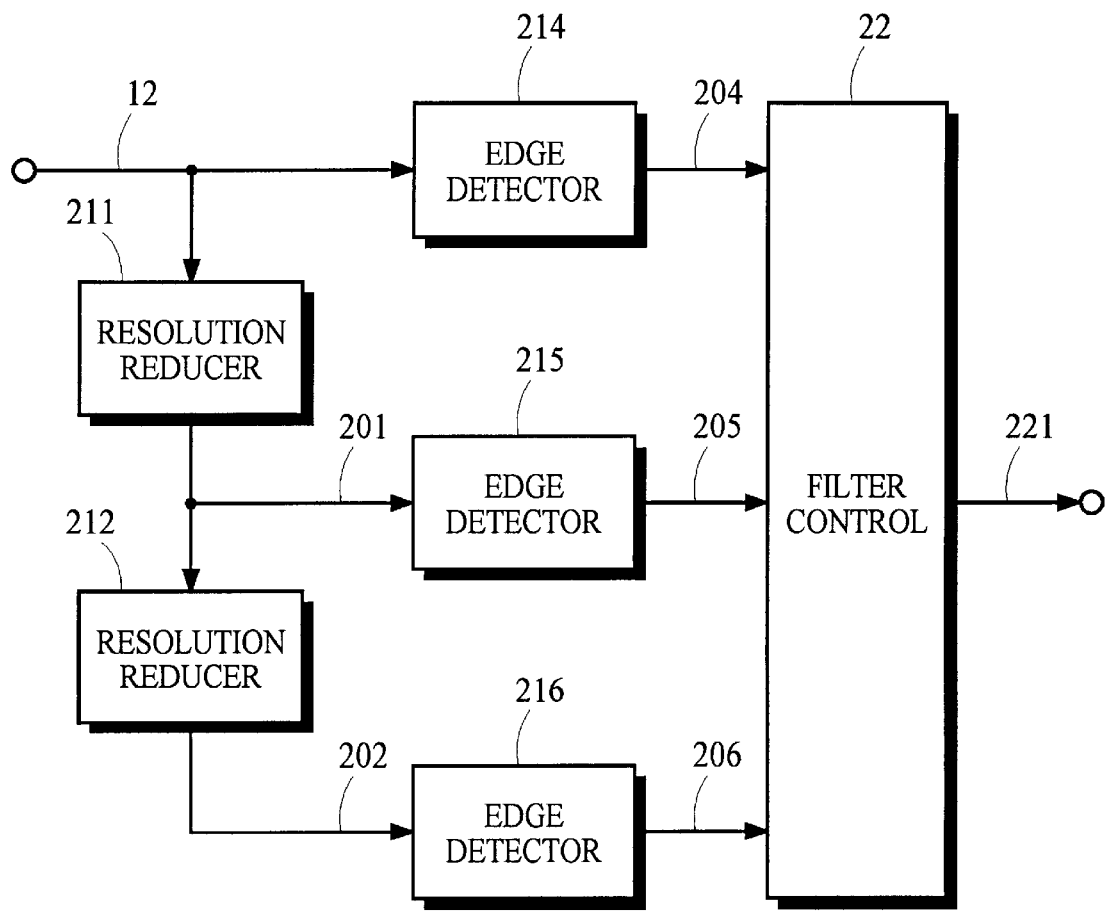
FIG. 13 is a block diagram of components that may be used to implement an image analyzer and a filter control according to the present invention.

FIG. 13 is a block diagram illustrating filter control 22 and one embodiment of image analyzer 21. In this embodiment, image 21 receives from path 12 a representation of an image at a particular resolution for hierarchical level 0 and, in response, resolution reducer 211 generates along path 201 another representation with reduced resolution at hierarchical level 1. Resolution reducer 222 receives the level 1 representation from path 201 and, in response, generates along path 202 a representation with reduced resolution at hierarchical level 2. Edge detector 214 receives from path 12 the representation at hierarchical level 0 and generates along path 204 an indication whether any edges are detected in regions of the level 0 representation. For ease of discussion, the term "edge" as used herein refers to essentially any high spatial-frequency content. Edge detector 215 receives from path 201 the representation at hierarchical level 1 and generates along path 205 an indication whether any edges are detected in regions of the level 1 representation. Edge detector 216 receives from path 202 the representation at hierarchical level 2 and generates along path 206 an indication whether any edges are detected in regions of the level 2 representation. Filter control 22 receives the indications of edges from paths 204 through 206 and, in response, generates along path 221 a signal that is used to control the operation of image filter 23.

Filter Control

If edge detectors 214 through 216 detect edges in corresponding regions of the representations at all levels, that region in the level 0 representation is classified as containing a "global edge". If only edge detector 214 detects an edge for a particular region, that region is classified as containing a "local edge". If edge detectors 214 and 215 detect edges in corresponding regions of the representations but edge detector 216 does not detect an edge for that region, the region is classified as containing an "intermediate edge". In embodiments that comprise more than three hierarchical levels, a region may be classified as containing an intermediate edge that varies progressively from "local" to "global" as the number of low-resolution levels increases in which an edge is detected. These classifications are used by filter control 23 to control filter 23. Generally, regions with edges that are more global are filtered less and regions with edges that are more local are filtered more.

In a preferred embodiment of the present invention, regions having local edges that are detected in only hierarchical level 0 are deemed to be regions lacking significant high-frequency content. Local edges that are detected in only level 0, such as the edges of the dots in the halftone screen, are not considered significant to the perceived quality of the image and need not be preserved to obtain a high-quality rendition. As a result, more filtering can be applied to regions with only local edges to reduce moiré without adversely blurring the image. On the other hand, global edges detected in all hierarchical levels are considered significant high-frequency content that should be preserved to obtain a high-quality rendition. As a result, little or no filtering should be applied to regions with global edges. Intermediate amounts of filtering are applied to regions that have intermediate edges.

Figure 14:
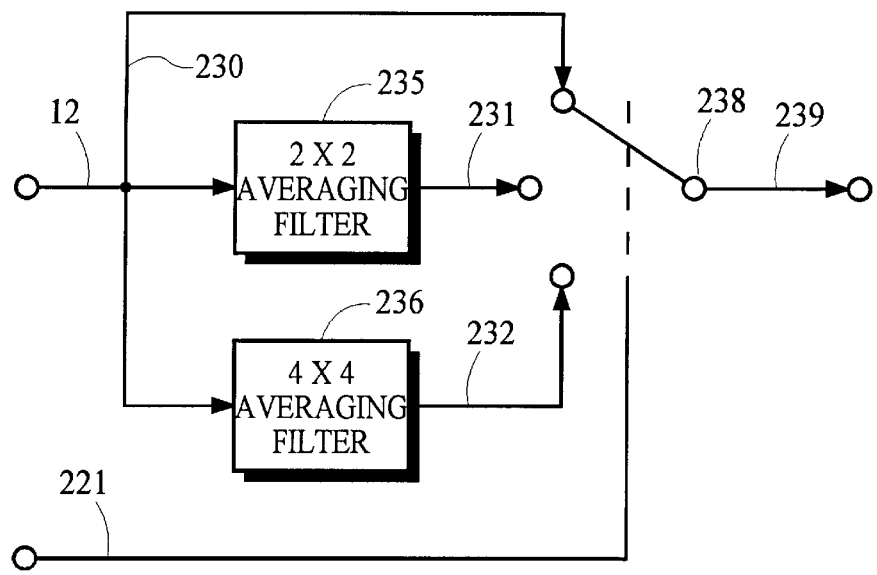
FIGS. 14 and 15 are block diagrams of filters that may be incorporated into embodiments of the present invention.

A first embodiment of filter 23 is illustrated in FIG. 14. In this first embodiment, filter 23 has three paths that may be selected by switch 238 to provide varying amounts of filtering to regions of the image. Switch 238 selects path 230, which applies no filtering, in response to a control signal received from path 221 indicating a region contains a global edge. Switch 238 selects path 231, which includes filter 235, to apply a 2×2 averaging filter in response to a control signal from path 221 indicating a region contains an intermediate edge. Switch 238 selects path 232, which includes filter 236, to apply a 4×4 averaging filter in response to a control signal from path 221 indicating a region contains no edges or only local edges.

Figure 15:
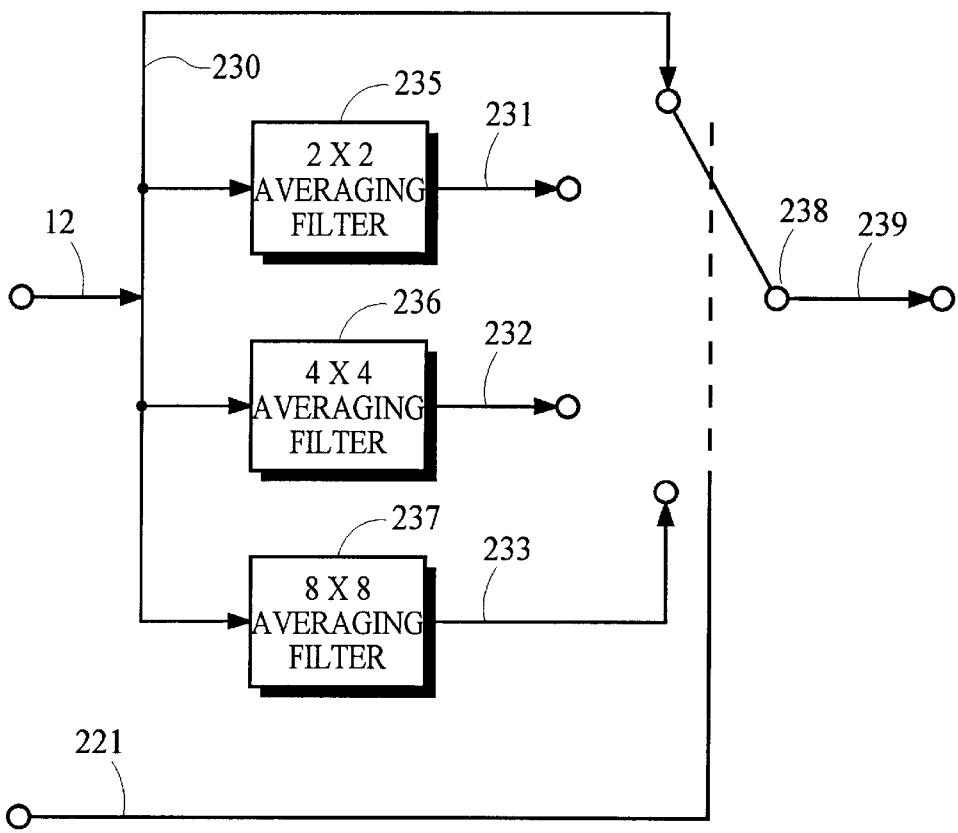

A second embodiment of filter 23 is illustrated in FIG. 15. This second embodiment is similar to the first embodiment illustrated in FIG. 14 and has an additional path 233, which includes filter 237, that can be selected by switch 238 to apply an 8×8 averaging filter.

In a third embodiment not shown in any figure, filter 23 has two paths that can be selected by switch 238. The third embodiment includes paths 230 and 231.

Figure 16:
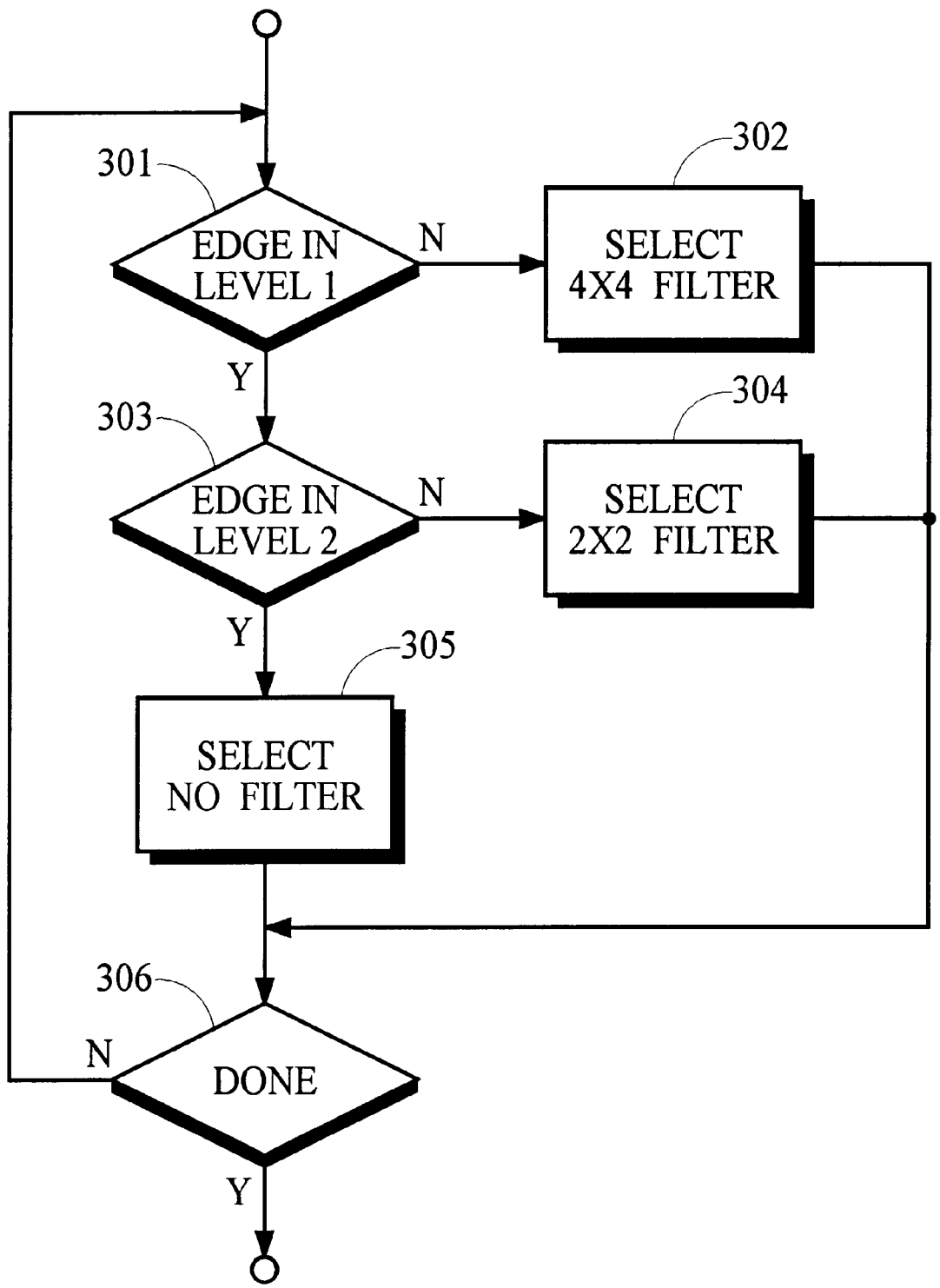
FIGS. 16 and 17 are block diagrams of processes that may be used to control image filters according to the teachings of the present invention.

FIG. 16 illustrates steps in a suitable process for controlling the first embodiment of filter 23 shown in FIG. 14. Step 301 determines whether an edge is detected in a region within the level 1 representation. If no edge is detected, step 302 generates a control signal selecting the 4×4 filter in path 232. If an edge is detected in level 1, step 303 determines whether an edge is detected in the corresponding region within the level 2 representation. If no edge is detected in level 2, step 304 generates a control signal selecting the 2×2 filter in path 231. If an edge is detected in level 2, step 305 generates a control signal selecting path 230 that has no filter. Step 306 determines if this process is done and, if not, returns to step 301 to reiterate the process for another region. In this particular embodiment, there is no need to determine whether an edge is detected in the level 0 representation. Referring to FIG. 13, a suitable embodiment of image analysis 21 need not include edge detector 214.

Figure 17:
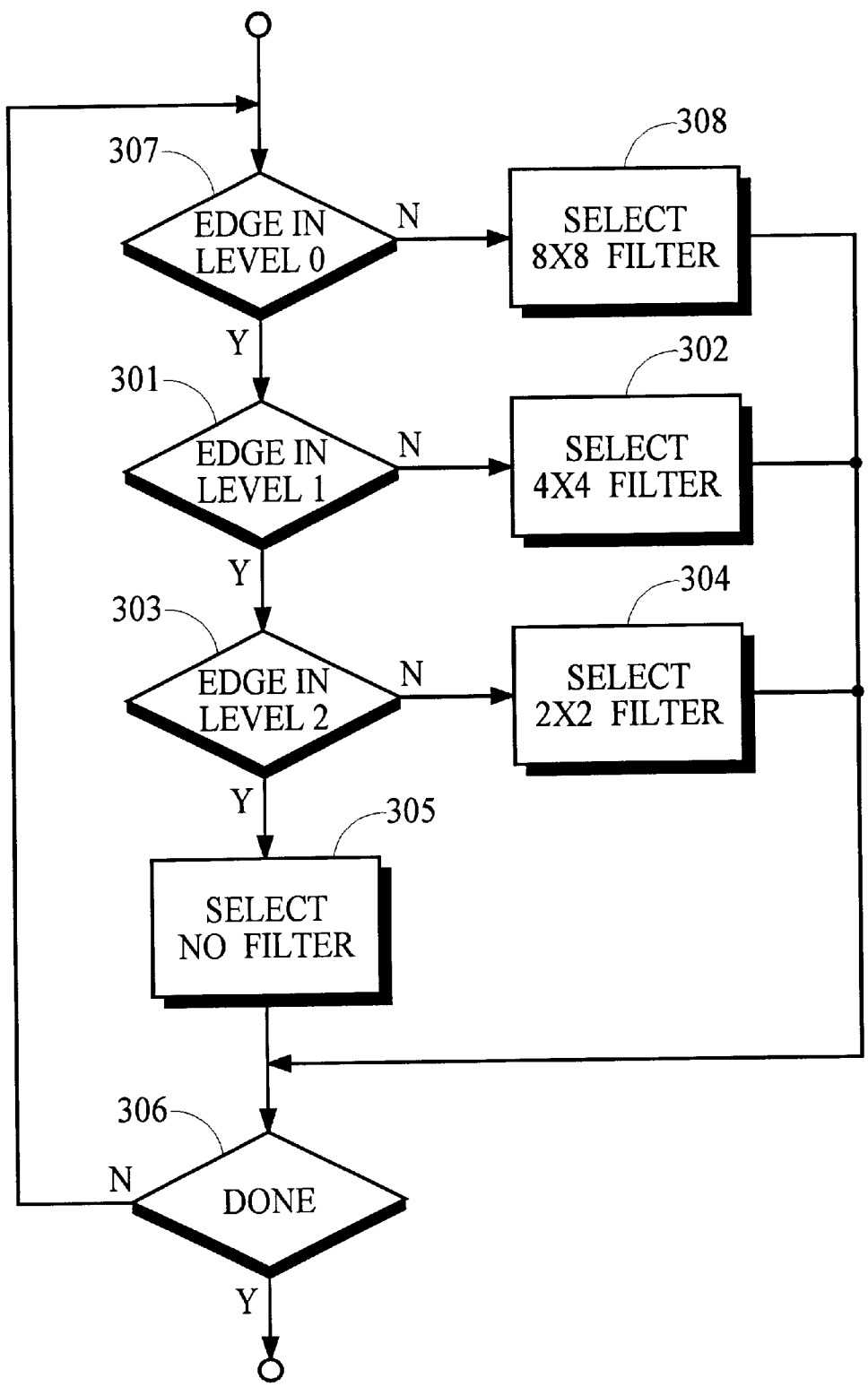

FIG. 17 illustrates steps in a process that is suitable for controlling the second embodiment of filter 23 shown in FIG. 15. This process is similar to the process shown in FIG. 16 and includes an additional step 307 that determines whether an edge is detected in a region within the level 0 representation. If an edge is detected in level 0, step 308 generates a control signal selecting the 8×8 filter in path 233. If no edge is detected in level 0, the process continues with step 301 as discussed above. In this embodiment, an edge for the level 0 representation is used. Referring to FIG. 13, a suitable embodiment of image analysis 21 includes edge detector 214.

Advantages

The techniques for hierarchical edge detection and filter control discussed above can be implemented efficiently using only relatively small amounts of memory for the image. For example, it is possible to realize a practical implementation using only enough memory to store small regions of the total image because edge detection and image filtering are performed within regions in a manner that is independent of other regions.

Another advantage of these techniques is that they can accommodate wide variations in screen frequency and screen angle. This is particularly advantageous for images that comprise areas having multiple screen frequencies and/or screen angles.

Alternative Embodiments

A few embodiments of image processor 20 are described above. Each of these embodiments provide a variable amount of image filtering controlled by a hierarchical edge detector that determines the presence of edges in image representations having different resolutions. A wide range of alternative embodiments are possible. A few additional embodiments are described in the following paragraphs.

Figure 18:
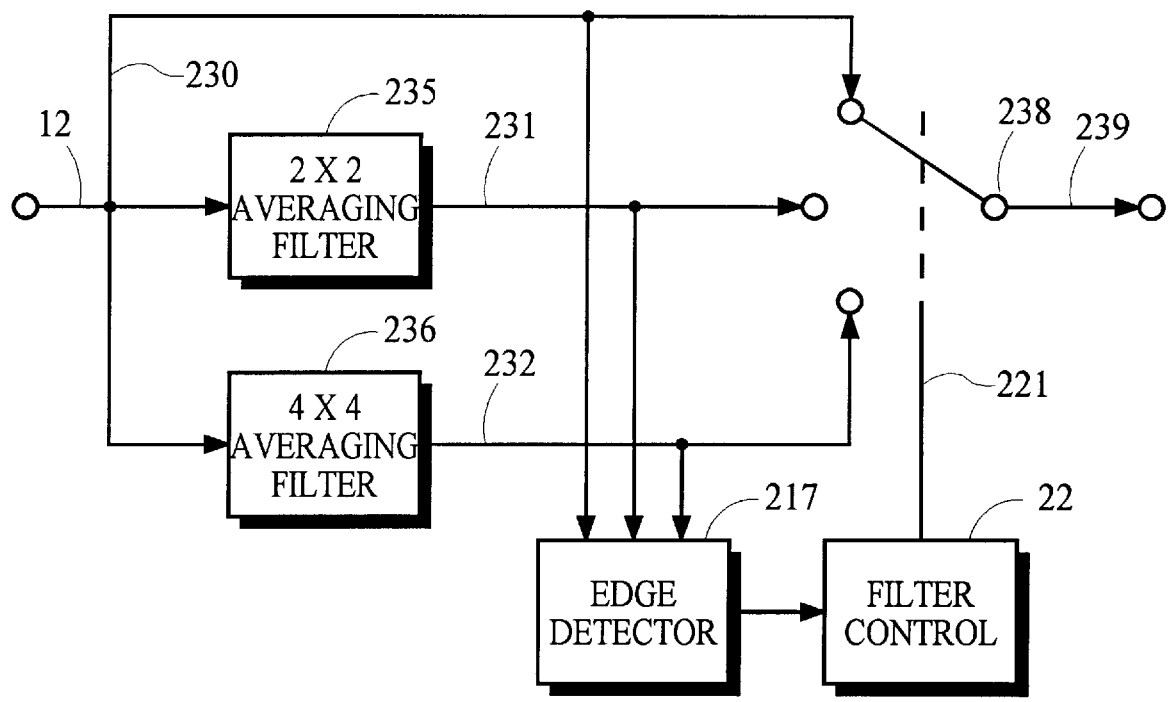
FIG. 18 is a block diagram of components incorporated into an alternative embodiment of image processor according to the present invention.

In one alternative embodiment, averaging filters are used to filter the image representation and to obtain representations at reduced resolutions for image analysis. Referring to FIG. 18, for example, edge detector 217 receives a level 0 representation from path 230, receives a level 1 representation from path 231, and receives a level 2 representation from path 232. An indication of the presence of edges in each of the levels is passed to filter control 22, which controls switch 238 in the manner discussed above. In this particular implementation, edge detector 217 analyzes subsets of the dots in the level 1 and level 2 representations. For example, only one dot in each 2×2 group of dots obtained from averaging filters 235 is included in the analysis.

In another alternative embodiment, the level 0 representation has a resolution that is reduced with respect to the input resolution. For example, referring to FIG. 13, image analysis 21 for this alternative would include an additional resolution reducer interposed between path 12 and edge detector 214.

In a further alternative embodiment, filter 23 includes a filter in each path. For example, referring to FIG. 14, a three-path version of filter 23 for this alternative would include a 2×2 averaging filter in path 230, a 4×4 averaging filter in path 231, and an 8×8 averaging filter in path 232.

In yet another alternative embodiment, filter 23 includes at least one averaging filter having a length that is not a power of two.

In yet a further alternative embodiment, filter 23 includes one or more filters that are not averaging filters. For example, the embodiment of filter 23 shown in FIG. 14 may be modified so that filters 235 and 236 are low-pass filters of essentially any design and the cutoff frequency of filter 236 is lower than the cutoff frequency of filter 235.

What is claimed is:

1. A method for reproducing a screened image with reduced moiré, wherein the method comprises:

analyzing a plurality of representations of the screened image to detect edges, each representation having a respective resolution, performing edge detection analysis in each resolution independent of the other resolutions, wherein, if edges are detected in corresponding regions of the representations at all resolutions, that region is classified as containing a first type of edge, if an edge is only detected in a particular region at the first resolution, that region is classified as containing a second type of edge, if edges are only detected in corresponding regions at the first resolution and a second resolution that region is classified as containing a third type of edge, generating a control signal for each region of the screened image, wherein the control signal is generated for a respective region based on the type of edge detected in that respective region, and generating an output signal reproducing the screened image with reduced moiré by filtering the screened image, wherein a respective region is filtered by an amount that varies according the control signal for the respective region.

2. A method according to claim 1 wherein the respective region is filtered by an averaging filter having a size that varies according to the control signal for the respective region.

3. A method according to claim 1 wherein a respective region is analyzed independently of other regions to generate the control signal, and a respective region is filtered independently of other regions to generate a portion of the output signal.

4. A method according to claim 1 wherein the screened image comprises dots in areas having a plurality of screen frequencies.

5. A method according to claim 1 wherein the screened image comprises dots in a plurality of colors.

6. An apparatus for receiving a first input signal conveying a screened image and, in response thereto, generating an output signal reproducing the image in a form having reduced moiré, wherein the apparatus comprises:

a plurality of filters, each filter having a size, a filter output, and a filter input receiving the first input signal, a plurality of input terminals, each input terminal receiving a plurality of second input signals representing the image in respective resolutions, a plurality of edge detectors, each of the edge detectors having a detector input coupled to a respective input terminal and having a detector output, a controller having a control output and a plurality of control inputs, each control input coupled to the detector output of a respective edge detector, the controller being adapted to perform edge detection analysis in each resolution independent of the other resolutions based on the edge detector outputs, wherein, if edges are detected in corresponding regions of the representations at all resolutions, that region is classified as containing a first type of edge, if an edge is only detected in a particular region at the first resolution, that region is classified as containing a second type of edge, if edges are only detected in corresponding regions at the first resolution and a second resolution that region is classified as containing a third type of edge, a selector having a selector-control input, a plurality of selector inputs and a selector output, the selector-control input coupled to the control output of the controller and a respective selector input coupled to the filter output of a respective filter, and an output terminal coupled to the selector output to convey the output signal.

7. An apparatus according to claim 6 wherein the filters are averaging filters having a respective size that is an integral power of two.

8. An apparatus according to claim 7 wherein each input terminal is coupled to the filter output of a respective averaging filter.

9. An apparatus according to claim 6 wherein each input terminal is coupled to the output of a respective resolution-reduction filter having an input receiving the input signal and having a respective low pass frequency characteristic.

10. An apparatus according to claim 6 comprising memory coupled to the detector inputs and the filter inputs, wherein the edge detectors analyze portions of the second input signals that each represent a corresponding region of the image, a respective filter is applied to a portion of the first input signal that represents a respective region of the image, and wherein the memory has a capacity that is sufficient to store the portions of the second input signals representing the corresponding region and the portion of the first input signal representing the respective region but is insufficient to store enough of the second input signals and the first input signal to represent the entire image.

11. An apparatus according to claim 6 wherein the plurality of edge detectors analyze a respective region of the image independently of other regions to detect edges, and the plurality of filters are applied to a respective region of the image independently of other regions to generate a portion of the output signal.

12. An apparatus according to claim 6 wherein the first input signal conveys dots representing the image with a plurality of screen frequencies.

13. An apparatus according to claim 6 wherein the first input signal conveys dots representing the image in a plurality of colors.

14. An apparatus for reproducing a screened image with reduced moiré, wherein the apparatus comprises:

means for analyzing a plurality of representations of the screened image to detect edges, each representation having a respective resolution, means for performing edge detection analysis in each resolution independent of the other resolutions, wherein, if edges are detected in corresponding regions of the representations at all resolutions, that region is classified as containing a first type of edge, if an edge is only detected in a particular region at the first resolution, that region is classified as containing a second type of edge, if edges are only detected in corresponding regions at the first resolution and a second resolution that region is classified as containing a third type of edge, means for generating a control signal for each region of the screened image, wherein the control signal is generated for a respective region based on the type of edge detected in that respective region, and means for generating an output signal reproducing the screened image with reduced moiré by filtering the screened image, wherein a respective region is filtered by an amount that varies according the control signal for the respective region.

15. An apparatus according to claim 14 wherein the respective region is filtered by an averaging filter having a size that varies according to the control signal for the respective region.

16. An apparatus according to claim 14 wherein a respective region is analyzed independently of other regions to generate the control signal, and a respective region is filtered independently of other regions to generate a portion of the output signal.

17. An apparatus according to claim 14 wherein the screened image comprises dots in areas having a plurality of screen frequencies.

18. An apparatus according to claim 14 wherein the screened image comprises dots in a plurality of colors.

19. A medium readable by a machine embodying a program of instructions for execution by said machine to perform a method for reproducing a screened image with reduced moiré, wherein said method comprises:

analyzing a plurality of representations of the screened image to detect edges, each representation having a respective resolution, performing edge detection analysis in each resolution independent of the other resolutions, wherein, if edges are detected in corresponding regions of the representations at all resolutions, that region is classified as containing a first type of edge, if an edge is only detected in a particular region at the first resolution, that region is classified as containing a second type of edge, if edges are only detected in corresponding regions at the first resolution and a second resolution that region is classified as containing a third type of edge, generating a control signal for each region of the screened image, wherein the control signal is generated for a respective region based on the type of edge detected in that respective region, and generating an output signal reproducing the screened image with reduced moiré by filtering the screened image, wherein a respective region is filtered by an amount that varies according the control signal for the respective region.

20. A medium according to claim 19 wherein the respective region is filtered by an averaging filter having a size that varies according to the control signal for the respective region.

21. A medium according to claim 19 wherein a respective region is analyzed independently of other regions to generate the control signal, and a respective region is filtered independently of other regions to generate a portion of the output signal.

22. A medium according to claim 19 wherein the screened image comprises dots in areas having a plurality of screen frequencies.

23. A medium according to claim 19 wherein the screened image comprises dots in a plurality of colors.

* * * * *

UNITED STATES PATENT AND TRADEMARK OFFICE
CERTIFICATE OF CORRECTION

PATENT NO.   : 6,233,060 B1
DATED        : May 15, 2001
INVENTOR(S)  : Joseph Shu et al.

It is certified that error appears in the above-identified patent and that said Letters Patent is hereby corrected as shown below:

Column 16, claim 1,
Line 14, after "according" insert -- to --.

Column 17, claim 14,
After "according" insert -- to --.

Column 18, claim 19,
After "according" insert -- to --.

Signed and Sealed this

Twenty-sixth Day of February, 2002

Attest:

Attesting Officer

JAMES E. ROGAN
Director of the United States Patent and Trademark Office